Aug. 13, 1929.                H. W. EKHOLM                    1,724,265
           SAFETY LOOP SUPPORT OR HANGER FOR BOTTOM CONNECTING RODS
                         Filed Nov. 27, 1925        2 Sheets-Sheet 1
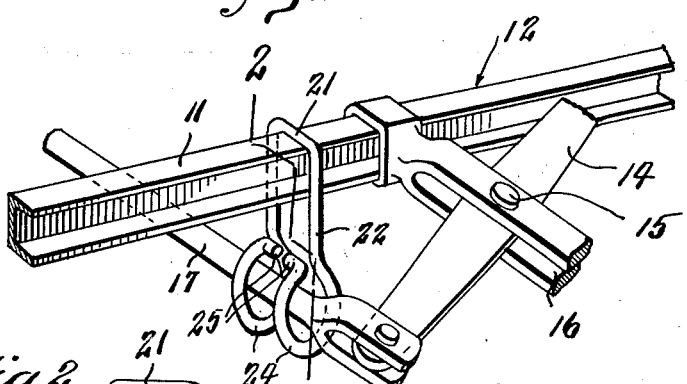
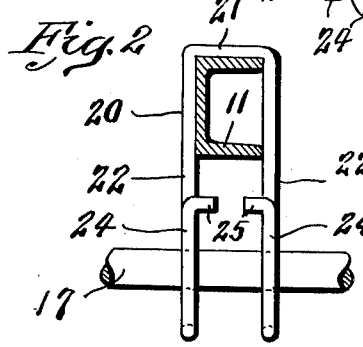
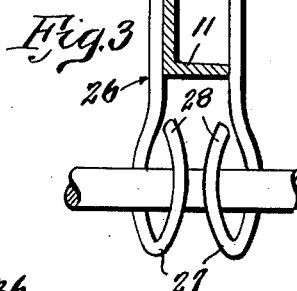
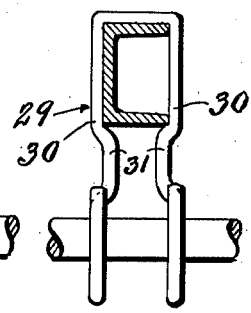
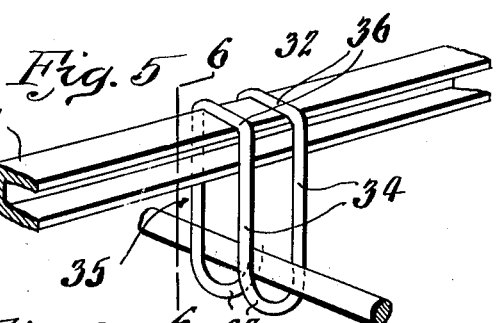
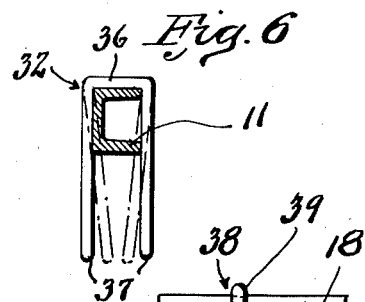
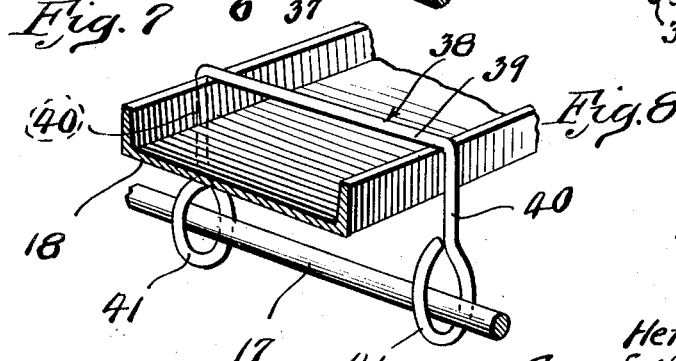
Inventor
Herbert W. Ekholm Aug. 13, 1929.  H. W. EKHOLM  1,724,265
SAFETY LOOP SUPPORT OR HANGER FOR BOTTOM CONNECTING RODS
Filed Nov. 27, 1925  2 Sheets-Sheet 2
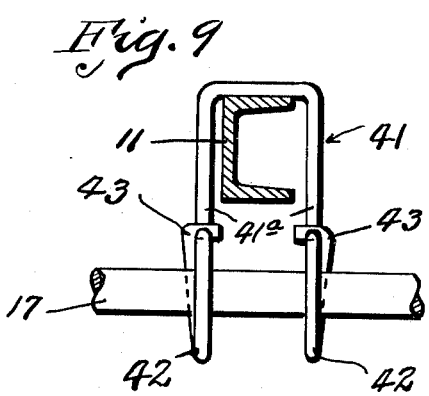
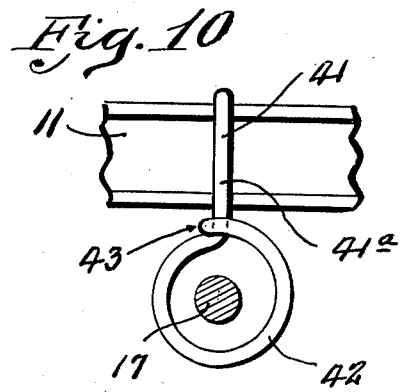
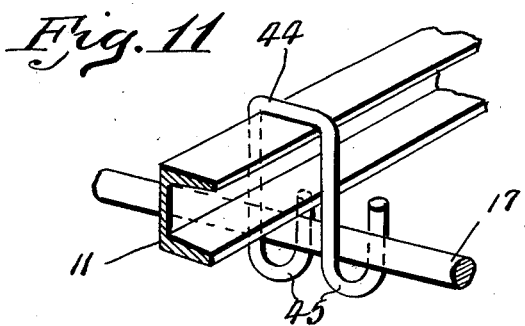
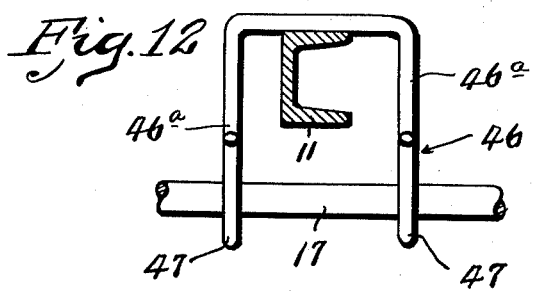
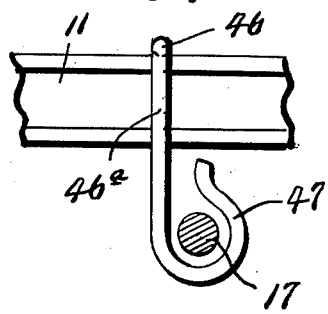
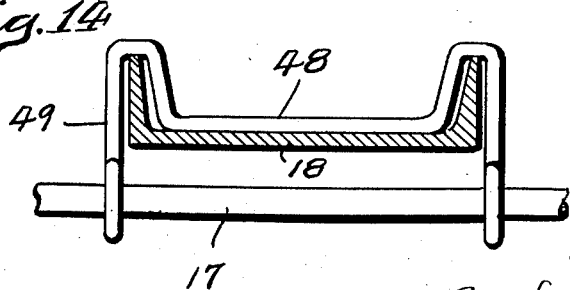
Inventor
Herbert W. Ekholm
By Cornwall, Bedell+Janney
Att'ys.

Patented Aug. 13, 1929.

1,724,265

UNITED STATES PATENT OFFICE.

HERBERT W. EKHOLM, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY LOOP SUPPORT OR HANGER FOR BOTTOM CONNECTING RODS.

Application filed November 27, 1925. Serial No. 71,655.

This invention relates to new and useful improvements in safety loop supports for bottom connection rods of brake gears, and the objects of the present invention are to provide a safety loop support formed of a single piece of material bent into an inverted U-shape to straddle a carrying or supporting member and having its depending ends rebent to encircle or underlie said brake rod connection.

Further objects of the invention are to form downwardly extending portions of the support with lateral projections extending under the supporting or carrying member and adapted to engage the underside thereof in order to prevent upward movement or displacement of said loop support.

With these and other objects in view, my invention consists in certain novel features of construction and arrangement of parts, hereinafter more fully described and claimed, and illustrated in the accompanying drawings, in which—

Figure 1 is a perspective view of a portion of a brake beam showing the brake lever carried thereby and connected to one end of the bottom brake rod with the loop support in position to catch and support said brake rod in case of displacement thereof.

Figure 2 is a cross section taken on line 2—2 of Figure 1.

Figure 3 is a transverse cross section similar to Figure 2 and showing a modified form of safety loop wherein the upturned ends of the depending portions are spaced laterally under the carrying member.

Figure 4 is another modified form wherein the depending portions are provided with laterally and inwardly disposed projections for bearing against the underside of the supporting member.

Figure 5 shows another modified form of safety loop support consisting of a closed loop member bent into U-shape and having its end portions depending from a carrying member and each receiving a bottom brake rod connection.

Figure 6 is a transverse cross section taken on line 6—6 of Figure 5.

Figure 7 is a perspective view showing another modified form of a safety loop support designed for use in connection with a spring plank of a car truck.

Figure 8 is an end elevational view of a safety loop support shown in Figure 7.

Figure 9 is a front elevation of a modified form.

Figure 10 is an end view of same.

Figure 11 is a perspective detail view of another modified form.

Figures 12 and 13 show further modified forms.

Figure 14 shows another modified form of my invention as applied to a car truck part.

Referring by numerals to the accompanying drawings, 1 indicates a supporting element which in the present instance is the compression member 11 of a brake beam 12, but may be a part of a truck such as a spring plank. A brake lever 14 is fulcrumed at 15 to a strut member 16 of said beam 12. The lower end of lever 14 is connected to one end of a lower brake rod 17, known as the bottom connection rod of the brake gear, while the other end of said rod is connected to the associate brake lever on the other side of the spring plank. Rod 17 extends longitudinally of the car and passes under the compression member 11 and the spring plank on the car truck, and is connected at its opposite end to another brake lever. Usually one of these brake levers will be a "live" lever and the other will be a "dead" lever. This construction just described is familiar in truck equipment and is of standard form.

In order to prevent brake connecting rod 17 from dropping to the ground in case of accidental disengagement thereof from the associated parts, a safety loop support member is provided so as to catch said rod and hold it against displacement.

In the form shown in Figures 1 and 2, the safety support consists of a member 20 bent into an inverted U-shape to provide an upper light formation having a horizontal portion 21 and depending leg portions 22 for straddling compression member 11. The end portions of legs 22 are rebent upwardly to provide spaced aligned loop portions 24 which are adapted to encircle rod 17. The extreme ends of portions 24 are bent laterally and inwardly as indicated at 25 so as to be disposed under compression member 11. Thus member 20 is supported on compression member 11 and is prevented from being unseated or displaced therefrom by lateral projections 25. In addition, rod 17 by virtue of the interengagement of said rod with loops 24 prevents accidental removal of member 20 by abnormal upward movement. Member 20 is preferably made of spring material and when placed on the supporting member is held thereon by the resiliency of depending portions 22 which frictionally engage the supporting member.

In the form shown in Figure 3, the support member 26 has its depending portions terminating in loops 27 the ends of which are deflected inwardly toward each other as indicated at 28 in order to place said end portions below and in vertical plane with the supporting member 11.

In the form shown in Figure 4, member 29 is provided in its depending portions 30 with laterally disposed bends or jogs 31 which when said member 29 is placed in position are disposed below and bear against the underside of the supporting member.

While in the form shown in Figures 1 to 4 the end or loop portions are left open so that the brake rod can be inserted therein by forcing said rod between said end portions and the depending leg portions of the support, the support members in the above form being formed resilient, said seat portions will yield to permit the passage of brake rod and will immediately spring back and close the passage and prevent accidental displacement of the rod therethrough.

In the form shown in Figures 5 and 6, a safety hanger or support 32 is formed by bending the parallel portions 34 of a link 35 into U-shape so as to provide horizontally disposed portions 36 for resting on the supporting member and bring the closed end portions 37 in position to receive the bottom brake rod connection 17.

In the form shown in Figures 5 and 6 member 32 being closed, it is necessary to thread the rod through the end portions 37.

In the modified form shown in Figures 7 and 8, a safety support 38 is formed in a U-shape and has its horizontal portion 39 sufficiently long to permit the leg portions 40 to straddle spring plank 18 of a car truck. Depending portions 40 terminate in loops 41 for engaging brake rod 17.

In Figures 9 and 10 is shown another modified form, wherein straddling member 41 terminates in looped ends 42, the extremities of which are hooked as at 43 and interlock with the shank portions 41ᵃ of member 41. This construction greatly strengthens the loops and limits upward movement of rod 17.

The form shown in Figure 11 comprises an inverted U-shaped strap 44 straddling a carrier and having its ends formed into hooks 45 for partially embracing the rod 17.

Figures 12 and 13 show similar construction; however, the straddling member 46 is of greater width than the carrier 11, thereby spacing the legs 46ᵃ from the sides of carrier 11 and the ends of hooks 47 are deflected inwardly to restrict the openings.

The form shown in Figure 14 is similar to the form disclosed in Figure 7; in the present form, however, the portion between the flanges of the spring plank is depressed as at 48 so as to enable the support member 49 to bear on the full width of the spring plank, thereby providing better engagement of the support member with the carrier 18.

My improvement consists of an inverted U-shape strap adapted to straddle a carrier, which may be a brake beam or spring plank or other part of the truck. The U-shape member or safety hanger is slipped over such carrier and when the connecting rod is inserted in the loop it is impossible to remove the safety hanger without first removing the bottom connection. Also the safety hanger can not become accidentally detached without removal of the connecting rod. Hence the bottom connecting rod acts as a lock and prevents displacement of the safety hanger.

I claim:

1. A single piece U-shaped safety support for brake beam rods adapted to straddle and to be supported by a brake beam member and having depending leg portions extending on each side of said supporting member and terminating below said supporting member in closed loop portions for encircling and supporting said brake beam rod.

2. A single piece safety support device for brake beam connecting rods comprising a section of a rod bent in U-shape and adapted to straddle a supporting member and having depending portions extending on each side of said supporting member and terminating in closed loop ends for encircling and supporting said connecting rod.

3. A single piece safety support device for brake beam connecting rods comprising a section of a rod bent into U-shape adapted to straddle a supporting member and extend downwardly on each side of said supporting member and terminating in loop ends closed on sides and bottom for encircling and supporting said connecting rod, said safety support member being provided with laterally and oppositely projecting portions adapted to engage the underside of said supporting member to prevent vertical movement of said safety support member.

4. A single piece safety support or hanger for brake connection rods comprising a section of a rod bent into an inverted U-shape adapted to straddle a supporting member and having depending leg portions terminating in loop ends spaced below said supporting member for encircling said brake connection rod.

5. In a car construction, the combination with a transverse supporting element of a car truck, of a supporting device for brake connection rods comprising a portion straddling said supporting member and having legs extending on each side of said supporting member and terminating in loop ends closed on sides and bottom for preventing lateral and downward movement of said brake connection rod, said leg portions being provided with opposed inwardly and laterally deflected portions adapted to bear against the underside of said supporting element to prevent upward movement of said device.

6. In a safety support or hanger for brake connecting rods, the combination with a brake beam element, of an inverted U-shaped member detachably straddling said brake beam element and having its depending portions extending on each side of said supporting element, closed looped portions formed on the ends of said U-shaped member for receiving a brake connection rod, said rod being threaded through said loop ends and normally spaced therefrom and adapted to be supported thereby in case of disengagement of said rod.

7. A safety support or hanger for bottom connecting rods of brake gears, comprising in combination with a supporting element, a member bent into U-shape to provide a horizontally disposed portion for straddling said supporting element and having its depending portions disposed on each side of said supporting element and terminating in closed looped ends for receiving said brake rods, said depending portions being provided with laterally and inwardly disposed projections adapted to bear against the underside of said supporting member to prevent the displacement of said safety support.

8. In a car construction, a safety hanger for bottom connection rods comprising a one piece rod of inverted U-shape adapted to straddle a carrier disposed transversely of a bottom connection rod, said inverted U-shaped rod having depending portions extending on each side of said carrier and terminating in loops closed on bottom and sides, said bottom connection rod being adapted to be threaded through said loops transversely of said carrier thereby eliminating the upward movement of said safety hanger.

9. A single piece safety guard for brake connecting rods comprising an inverted U-shaped member adapted to straddle and be supported by a brake beam part and having its leg portions arranged on both sides of said brake beam part and terminating in loop ends extending in spaced relation under and on both sides of a brake connecting rod for catching and supporting the same in case of displacement thereof.

10. A bottom connection safety guard comprising an inverted U-shaped member, adapted to straddle an oscillating supporting member detachably connected to a car truck, and having its ends terminating in loops disposed below said oscillating supporting member and adapted to receive a bottom connecting rod, said safety guard being locked against upward displacement by said connecting rod.

11. A bottom connection safety guard comprising an inverted U-shaped member adapted to detachably straddle a brake beam part and having depending portions extending on each side of said brake beam part and terminating in aligned loops for receiving a bottom connecting rod, said guard being held against displacement on said brake beam part by said rod.

12. Suspending means for the connecting rod that unites the lower ends of live and dead brake levers comprising a loop having an upper bight formation through which a brake beam may be passed to be supported by the beam and having two lower spaced apart portions aligned to underlie the connecting rod.

13. Suspending means for the connecting rod that unites the lower ends of live and dead brake levers comprising a loop folded upon itself to provide two upper bight formations through which a beam may be passed to be supported by the beam and also to have two lower formations aligned to underlie the connecting rod.

14. A car brake connecting guard of inverted U-shape, each depending portion of which comprises an upright U-shape adapted to receive a bottom connection between its legs.

15. A car brake bottom connection guard comprising a rod bent into the form of an inverted U to straddle a carrier, with portions of its depending legs bent horizontally to receive a bottom connection, said hanger being positively locked against removal from its carrier when assembled with the carrier and a bottom connection.

16. In a safety guard for a railway brake bottom connection, a one-piece rod comprising a U-shaped portion adapted to receive and support a bottom connection, and an inverted U-shaped portion adapted to receive and be supported by a carrier, and an element on said inverted U-shaped portion for engaging a downwardly facing surface on the carrier to resist displacement of the guard on the carrier.

17. In a safety guard for a railway brake bottom connection, a one-piece rod comprising a U-shaped portion adapted to receive and support a bottom connection, and an inverted U-shaped portion adapted to receive and be supported by a carrier, the legs of said U-shaped portions merging with the legs of said inverted U-shaped portions, and elements on said legs for engaging a downwardly facing surface on said carrier to resist displacement of the guard on the carrier.

18. In a safety guard for a railway brake bottom connection, a one-piece rod comprising a pair of U-shaped portions, adapted to receive and support a bottom connection, and a pair of inverted U-shaped portions, adapted to receive and be supported by a carrier, the legs of said inverted U-shaped portions merging with the legs of said U-shaped portions.

In testimony whereof I hereunto affix my signature this 21st day of November, 1925.

HERBERT W. EKHOLM.